United States Patent [19]

Hsu et al.

[11] Patent Number: 5,290,903
[45] Date of Patent: Mar. 1, 1994

[54] COMPOSITE ABRASIVE WHEELS

[75] Inventors: Shyiguei Hsu, Watervliet; Michael P. Brock, Petersburg, both of N.Y.

[73] Assignee: Norton Company, Worcester, Mass.

[21] Appl. No.: 973,498

[22] Filed: Nov. 9, 1992

[51] Int. Cl.$^5$ ............................................. C08G 18/16
[52] U.S. Cl. ...................................... 528/53; 528/59; 528/60; 528/65
[58] Field of Search ..................... 528/53, 59, 60, 65

[56] References Cited

U.S. PATENT DOCUMENTS 2,958,593  11/1960  Hoover et al. ........................ 51/295
4,227,350  10/1980  Fitzer .................................... 51/295
4,609,380  9/1986  Barnett et al. ........................ 51/298

Primary Examiner—Maurice J. Welsh
Attorney, Agent, or Firm—David Bennett

[57] ABSTRACT

A composite abrasive wheel with improved thermal properties is comprised of a fibrous substrate with abrasive particles adhered thereto by a crosslinked polyurethane binder comprising heterocyclic groups. The heterocyclic structures, such as isocyanurate and/or oxazolidone rings, in the binder system improve the thermal properties required for a tough, durable abrasive wheel.

9 Claims, No Drawings

COMPOSITE ABRASIVE WHEELS

BACKGROUND OF THE INVENTION

Composite abrasive wheels are formed by adhering abrasive particles by means of an organic polymer to the fibers of a nonwoven fiber web. Multiple plies of such webs are then laminated to form a slab from which the wheels may be cut or the web may be wound spirally to form a log from which the wheels may be cut. Applications of these widely used wheels include polishing, deburring, finishing, and cleaning of metallic parts.

The surface temperature of the metallic part while being abraded by such a wheel can exceed 65° C. and some parts, depending on the alloy type, can even reach a surface temperature of 120° C. Therefore, the thermal properties of the organic polymer play a critical role in the performance requirements of the abrasive wheels as elevated temperatures are encountered in most applications.

Abrasive wheels with poor thermal properties often lead to undesirable "smearing" of the workpiece as a result of the contamination of the workpiece surface with melted binder. Also premature thermal degradation of the binder system reduces the useful life of the wheel. Thermal properties include softening point, melting point, glass transition point (Tg), and degradation temperature.

The most commonly used organic binder for use in composite wheels is a polyurethane such as is described for example in U.S. Pat. Nos. 2,885,276, 4,227,350 and 4,609,380.

A polyurethane has the generic structure

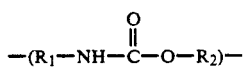

The thermal stability of polyurethane is a function of the nature of the linking groups $R_1$ and $R_2$, and most polyurethanes have a softening point that is relatively low.

U.S. Pat. No. 4,609,380 addresses this problem and uses a polymer blend of a polyurethane with a compatible polymer having a glass transition temperature of at least 50° C. to endow the blend with a glass transition temperature of at least 40° C.

In this patent the compatible polymer merely constitutes a part of the physical mixture when blended with high molecular thermoplastic polyurethanes, such as Estane resins from the B. F. Goodrich Company.

The present invention provides a different and more advantageous route to providing a binder with the required high temperature stability for optimum performance.

DESCRIPTION OF THE INVENTION

The present invention provides a novel crosslinked polyurethane binder of utility in the construction of composite abrasive wheels. It further provides composite abrasive wheels comprising such an abrasive and a method of making such wheels.

The novel polyurethanes of the invention are obtained by the reaction of an non-blocked, isocyanate-terminated polymer with an hydroxyl containing polymer in proportions to provide an —NCO/—OH ratio of at least 1.5 and preferably at least 4.0 and to yield a crosslinked polyurethane comprising isocyanurate and/or oxazolidone structures. The isocyanurate and/or oxazolidone structures can be generated by the catalyzed reaction of epoxide groups with stoichiometrically excess amounts of isocyanate groups.

Such polyurethane binders are very effective because they have a relatively high softening temperature that is typically above about 65° C. and is often above about 120 C.

In the making of a composite wheel, a fibrous web is usually saturated with a binder/grit mixture and the saturated web is then cured to a tack-free state and subjected to a second saturation treatment, again using a binder/abrasive mixture. In the preferred processes of the invention, the novel binder is used in the application of this second treatment. The first can be any of the conventional binder formulations comprising phenolic, melamine, UF or radiation curable resins.

Isocyanurates are best prepared by means of trimerization of isocyanates, using a variety of catalyst systems including tertiary amines, metal carboxylates, zwitterion, N-hydroxyalkyl quaternary ammonium carboxylate salts and combination catalyst systems. It is therefore essential that the reaction formulation comprise a stoichiometric excess of —NCO groups over —OH groups. The trimerization catalyst used to generate the desired structures are commercially available from a number of chemical companies including Air Products and Chemicals Co.

Poly(oxazolidones) are a relative new class of polymers. The formation of oxazolidone polymers can be carried out through the reaction between isocyanates and/or isocyanurates and epoxides, all employinq one or combinations of suitable catalysts that are well-known in the art, including tertiary amines, quaternary ammonium and phosphonium salts, metallic salts, metal alkyls, Lewis acids, and complexes of Lewis acids and Lewis bases.

Hard thermosetting resin binders obtained by the reaction of monomeric isocyanates with epoxides provide excellent thermal properties but are undesirably brittle for this type of application. In the present invention isocyanate prepolymers are used to reduce the brittleness without sacrificing the thermal properties.

If the blocked isocyanate-terminated polymers are reacted with polyfunctional active-hydrogen containing cure agent such as bis (4-amino phenyl) methane, (MDA), using NCO/Amine equivalent ratios a little more than 1:1 as is typical, this is found to be only sufficient for the urethane formation. It is well known in polyurethane chemistry that the unblocked reactive NCO groups will first react with the primary amine groups in the cure agent. Then the unreacted free isocyanate groups will react with any available primary hydroxyl, and lastly with any available secondary hydroxyl groups. In such cases, little crosslinking can occur in practice. Due to the isocyanate/Amine equivalent ratio and the reactivity difference, there is almost no direct reaction between the isocyanate-terminated polymer and any polymer that might be present in the formulations described in prior art formulations such as U.S. Pat. No. 4,689,380.

The composite abrasive wheels of the present invention may be prepared by appropriate techniques which are well known in the industry. The wheels are typically in the form of a disc or cylinder having dimensions required by end users. The matrix of the abrasive wheels may be either a nonwoven fibrous web or a foamed organic polymer with or without reinforcement.

The present invention also relates to the production of composite abrasive wheels with improved thermal properties by increasing the crosslinking density of the polyurethane binder and including isocyanurate and/or oxazolidone structures into the crosslinked linkages. The improved abrasive wheels greatly reduce the smearing tendency of a conventional binder based on a pure polyurethane structure.

Preferred abrasive products according to the present invention include a nonwoven fibrous web pre-bonded with water based latex, a first binder system based on hard thermosetting resin and abrasive particles, and a second binder system based on abrasive particles and crosslinked polyurethanes containing isocyanurate and/or oxazolidone structures and abrasive particles, as herein described.

The preferred crosslinkable pre-polymers are isocyanate terminated polyethers or polyesters which may then be reacted, in the presence of a tertiary amine trimerization catalyst, with polyfunctional polyols or a mixture of monomeric polyol and epoxy resins, such that the ratio of NCO/OH groups is at least 1.5 and more preferably 4.0. Monomeric isocyanates and polymeric isocyanurates may be used with the isocyanate-terminated polymers to adjust the crosslinking density of the cured binder and to produce the desired level of oxazolidone and/or isocyanurate structures in the polymer. It is preferred that the monomeric or polymeric isocyanate is blended with the isocyanate pre-polymer before reaction to produce the cross-linked polymers of the invention.

The most preferred binders are provided by a mixture of aromatic linear and branched isocyanate-terminated polymers cured with a mixture of monomeric polyol and epoxy resins in the presence of catalyst, with the components being present in amount to give an NCO-/OH ratio of at least 4.0 and preferably at least 4.5.

Examples of the preferred isocyanate-terminated prepolymers include the products available under the trade designation "Vibrathane" A8020, B635, and B670, from Uniroyal Corporation.

Examples of preferred polyfunctional polyols include monomeric polyols such as trimethylol propane, Pluracol TP440 available from Wyandotte Corporation, triisopropanol amine and glycerol, and polymeric polyols such as and hydroxl-containing epoxides.

The preferred curing agent is a tertiary amine available under the trade designation "Curimid-PTI", available from Poly-Organix, Inc., at a concentration of 0.1% or higher based on resin solids.

The preferred binder formulations according to the invention meet the following criteria in order to obtain the optimum thermal property improvement:

1. The isocyanate/primary OH ratio is 4.0 or greater, and
2. The isocyanate/total OH ratio is 1.5 or greater, and
3. The branched/linear isocyanate ratio is 0.09 or greater, and
4. The ratio of available free NCO (after the NCO—OH reaction) to epoxide is 12.0 or less.

The binder system can contain conventional lubricants of the type commonly used in the manufacture of composite abrasive products. An example of preferred lubricant that might be used in this invention is a mixture of metal stearate salt, such as zinc stearate or lithium stearate, and talc.

The abrasive particles used to produce the abrasive wheels of the present invention may be any known abrasive material commonly used in the abrasive industry.

DESCRIPTION OF THE PREFERRED EMBODIMENTS

The invention is further illustrated by the following non-limiting examples, wherein all parts are by weight unless otherwise specified.

EXAMPLE 1

A 9.4 mm thick, low density, non-woven, fibrous web weighing 95 g/m$^2$ was formed from 15 denier nylon 6-6 fibers on a web-forming machine. The resulting low density web was sprayed with a prebond binder to provide a dry add-on weight of between 40–48 g/m$^2$ using a spraying mix consisting of 55.9% styrenebutadiene latex (sold under the trade name "Tylac 68132" by Reichold Co.), 31.1% water, 10.5% melamine resin (sold under the trade name "Cymel 385" by American Cyanamide Co.), and trace amount of surfactant and acid catalyst. The prebond binder was cured to a tack-free state by passing the sprayed web through a convection oven maintained at 148.8° C. for a dwell time of 3.3 minutes. The resultant prebonded nonwoven web was about 8 mm thick and weighed about 128 g/m$^2$.

An adhesive binder (called first pass binder hereafter), consisting of 23.7% water, 28.0% of melamine resin (Cymel 385 by American Cyanamide Co.), 38.0% of silicon carbide grit 220, 0.15% defoamer, and 2.15% of acid catalyst (Catalyst 700 by Auralux Corp.) was used as a saturant for the prebonded web at the dry add-on weight of 123 g/m$^2$. The adhesive binder was cured to a tack-free state by passing the saturated web through a convection oven maintained at 157° C. for a dwell time of 3 minutes. The resultant web was about 6.4 mm thick and weighed about 252 g/m$^2$.

Sections of the abrasive/binder saturated web were then saturated again with another abrasive/binder mix (called second pass binder hereafter) identified "1–6" in Table I and partially dried to produce layers called "slabs" for lamination to form composite abrasive wheels.

Fifteen to eighteen 275 mm square sections of partially dried slabs with the same type second pass binder, were laminated by being placed between two metal plates and compressed to a thickness of 25.4mm. Then the whole assembly was placed in an oven maintained at 121° C. for one hour. At the end of one hour, the metal plates were removed and the cure was continued for another 15 hours. After allowing the cured laminated slabs to cool to room temperature, wheels having a 229 mm diameter and 25.4 mm center hole were die cut from the 25.4 mm thick laminated slabs.

The wheels, identified in Table I as Examples 1–6, were evaluated for binder transfer from the wheel to a titanium or stainless steel test workpiece, in the shape of a tube with a diameter of 75 mm and a length of 125 mm. The wheels were mounted on the shaft of a motor which rotated at 2850 rpm. The test workpiece was forced to rotate at 15 rpm against the abrasive wheel at a pressure of about 7000 N/m$^2$. A traversing mechanism was used to allow the test workpiece travel horizontally during the testing. The amount of material transferred from the test wheel was observed.

In the examples where epoxy resins with pendant secondary hydroxyl groups were blended with isocyanate-terminated polymers, no catalyst was used to initiate the reaction between the epoxide group and the isocyanates. And there were not enough excess free isocyanate groups to form isocyanurate structures.

EXAMPLE 2

In order to evaluate the effect of the heterocyclic isocyanurate on thermal properties, compression molded poly (urethane-isocyanurates) were prepared with various types of isocyanate-terminated resins and urethane-isocyanurate resins.

The isocyanate-terminated resins, or mixtures of the resins with a polymeric MDI (PAPI 901), were preheated to 90° C. and then vigorously mixed with the trimerization catalysts, Dabco TMR-2 (0.02%) and Polycat 41 (0.01%). The well mixed resin mixture was poured into a preheated (110° C.) Teflon coated mold and placed in a hydraulic press. The sample was demolded after on hour at 110° C. and subsequently postcured at 110° C. for another 15 hours.

The tensile properties were measured according to ASTM D412 with an Instron Series IX, Model 4204 tester.

The Shore hardness was measured according to ASTM D2240.

The amount of binder transfer of the molded samples were evaluated by pushing the samples against an 8" Aluminium wheel rotating at 2400 rpm. The results are shown in Table 2. Poly(urethane-isocyanurates) prepared by trimerizing the free isocyanate, (Samples #8, #10 and #12) exhibited less smear than those that were not so treated.

TABLE I

| Ingredients | 1 | 2 | 3 | 4 | 5 | 6 |
|---|---|---|---|---|---|---|
| Vibrathane B-635 | | | 25.90 | 22.86 | | |
| Vibrathane A-8020 | 26.42 | 27.84 | | | 23.39 | 16.58 |
| Nopcothane D-200 | 5.42 | 5.27 | 5.30 | 4.33 | 4.39 | 2.92 |
| Trimethyl propane | | 0.51 | | 0.42 | 0.48 | 0.32 |
| Glycerol | 0.94 | | 1.00 | | | |
| Inorganic Filler | 7.53 | 7.47 | 9.40 | 6.02 | 5.65 | 4.38 |
| Irganox 1035 | | | | 0.41 | 0.28 | 0.29 |
| Fluorad FC-171 | | | | 0.16 | 0.13 | 0.14 |
| Lubricant | 1.77 | 1.76 | 1.70 | 4.11 | 2.82 | 2.92 |
| Methyl Isobutyl Ketone | 15.84 | 13.19 | 12.40 | 14.71 | 14.32 | 14.47 |
| Aradite GT6097, 55% | | | | 7.16 | 7.25 | 7.15 |
| Curimid PTI | | | | 0.03 | 0.03 | 0.03 |
| Abrasive Particles | 42.10 | 43.96 | 41.30 | 35.79 | 36.26 | 44.80 |
| TOTAL | 100.02 | 100.00 | 100.00 | 100.0 | 100.00 | 100.00 |
| Equivalent Ratios | | | | | | |
| NCO/Primary OH | 1.33 | 4.19 | 1.44 | 4.90 | 4.38 | 4.64 |
| NCO/Total OH | 1.33 | 4.19 | 1.44 | 2.06 | 1.97 | 1.65 |
| Excess NCO/epoxide | — | — | — | 12.01 | 8.58 | 4.46 |
| Catalyst Conc. % | None | None | None | 0.10 | 0.10 | 0.13 |
| Resin Transfer | Heavy | Light | Light-Med | None | None | None |

TABLE II

| Designation | 7 | 8 | 9 | 10 | 11 | 12 |
|---|---|---|---|---|---|---|
| Vibrathane | A-8020 | A-8020 | B-635 | B-635 | B-670 | B-670 |
| Vibrathane/PAPI 901 Equivalent Ratio | 1/0 | 1/1 | 1/0 | 1/1 | 1/0 | 1/1 |
| Softening Pt. (°C.) | 250 | 263 | 276 | 264 | 276 | 267 |
| Ten. St Pa | 1.2 E+07 | 2.4 E+07 | 1.5 E+07 | 2.2 E+07 | 2.2 E+07 | 1.4 E+07 |
| Elongation at Break, % | 82 | 15 | 125 | 15 | 39 | 4 |
| Hardness, Shore A | 87 | 97 | 94 | 95 | 96 | 97 |
| Hardness, Shore B | 48 | 69 | 66 | 66 | 60 | 78 |
| Resin Transfer | Medium | V. slight | V. slight | None | V. slight | None |

What is claimed is:

1. A polyurethane having a softening temperature above 65° C. formed by the reaction, in the presence of a curing agent, of an isocyanate-terminated polymer with an hydroxyl-containing organic compound in proportions to provide an —NCO/—OH ratio of at least 1.5 to yield a crosslinked polyurethane comprising isocyanurate and/or oxazolidone structures.

2. A polyurethane according to claim 1 formed by reaction of an isocyanate-terminated polymer with a hydroxyl-containing organic compound in proportions such that the —NCO/—OH ratio is at least 4.0.

3. A polyurethane according to claim 1 having the formula:

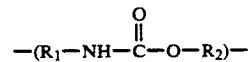

wherein at least some of the $R_1$ and $R_2$ groups are provided by oxazolidone and/or isocyanurate groups.

4. A polyurethane according to claim 1 in which the cure catalyst is a tertiary amine or its derivatives.

5. A polyurethane according to claim 1 in which the isocyanate-terminated polymer is selected from the group consisting of isocyanate-terminated polyethers and polyesters.

6. A polyurethane according to claim 5 in which the isocyanate-terminated polymer comprises branch chains with terminal isocyanate groups and the ratio of linear isocyanate to branch-chain isocyanate groups is at least 0.09.

7. A polyurethane according to claim 1 in which the hydroxyl-containing compound is selected from the group consisting of polyols and mixtures thereof.

8. A polyurethane according to claim 7 in which the hydroxyl-containing compound comprises primary hydroxyl groups and epoxy groups in such proportions that, after reaction of the isocyanate groups with the primary hydroxyl groups the ratio of —NCO groups to epoxide groups is no greater than about 12.0.

9. A polyurethane having a softening temperature above 50° C. formed by the reaction, in the presence of a tertiary amine curing agent, of a mixture of a polyol and an epoxy resin with an isocyanate-terminated polymer having branch chains terminating in isocyanate groups in proportions such that the ratio of terminal linear isocyanate groups to branch chain isocyanate groups is at least 0.09, the ratio of isocyanate to epoxy groups after reaction with all primary hydroxyl groups present is not greater than 12.0, and the ratio of —NCO/—OH groups is at least 4.0.

* * * * *